Figure 1:
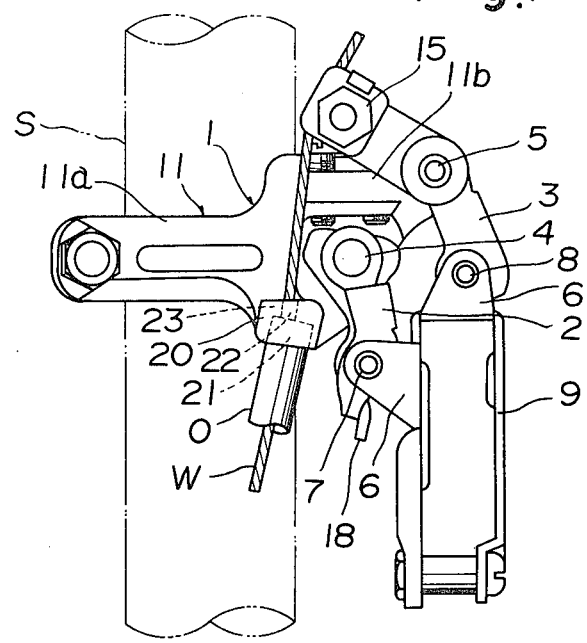

United States Patent [19]

Egami

[11] 4,279,605
[45] Jul. 21, 1981

[54] FRONT DERAILLEUR FOR A BICYCLE

[75] Inventor: Tetsufumi Egami, Sakai, Japan

[73] Assignee: Shimano Industrial Company Limited, Osaka, Japan

[21] Appl. No.: 70,650

[22] Filed: Aug. 28, 1979

[30] Foreign Application Priority Data

Sep. 13, 1978 [JP] Japan .......................... 53-126654[U]
Oct. 26, 1978 [JP] Japan .......................... 53-147828[U]

[51] Int. Cl.³ .......................... F16H 7/22; F16H 11/08
[52] U.S. Cl. ..................................... 474/82; 74/501 R
[58] Field of Search ..................... 74/217 B, 242.11 B, 74/242.14 B, 242.15 B, 501 R; 474/78-83

[56] References Cited

U.S. PATENT DOCUMENTS

| 3,730,012 | 5/1973 | Juy ................................ 74/242.15 B |
| 3,798,988 | 3/1974 | Nagano ................................ 474/82 |
| 3,813,955 | 6/1974 | Huret et al. ......................... 74/217 B |
| 3,890,847 | 6/1975 | Dian .................................. 74/217 B |
| 3,979,962 | 9/1976 | Kebsch .............................. 74/217 B |
| 4,030,374 | 6/1977 | Isobe ................................... 474/82 |
| 4,051,738 | 10/1977 | Dian .................................. 74/217 B |
| 4,174,851 | 11/1979 | Huret ................................ 74/217 B |

FOREIGN PATENT DOCUMENTS

| 876223 | 5/1953 | Fed. Rep. of Germany ......... 74/217 B |
| 1095695 | 12/1960 | Fed. Rep. of Germany ......... 74/217 B |
| 580449 | 9/1924 | France ................................... 74/501 R |
| 1031278 | 3/1953 | France ................................... 74/501 R |
| 68196 | 10/1957 | France ................................... 74/501 R |

OTHER PUBLICATIONS

The Handbook of Cyclology, 7th. Edition, p. 50, 1976.

Primary Examiner—Lawrence J. Staab
Attorney, Agent, or Firm—Stevens, Davis, Miller & Mosher

[57] ABSTRACT

An improved front derailleur for a bicycle, is provided with a mounting nose extending from a base member of the derailleur and with a support mounted to the nose integrally therewith or independently thereof, the support including an insertion bore for a control wire and a socket for an outer sheath guiding the wire. The mounting nose and support have guide slots in continuation of the insertion bore and extending therefrom, the guide slot extending in a direction away from a linkage member of the derailleur. The guide slots have a length larger than the maximum wire deflection created when a control wire having no outer sheath is operated.

7 Claims, 11 Drawing Figures

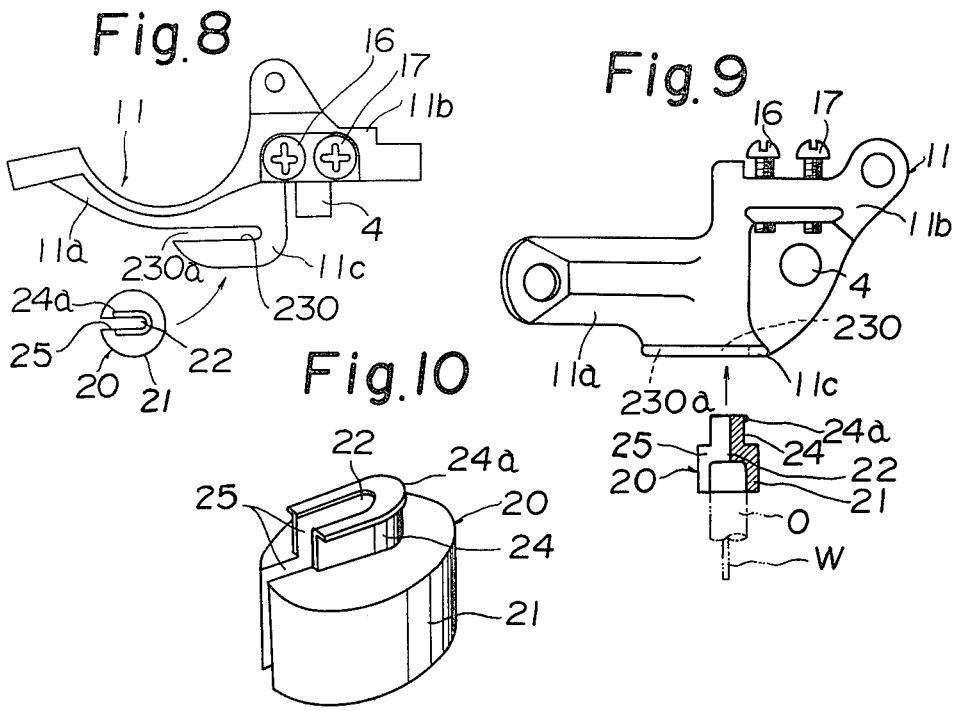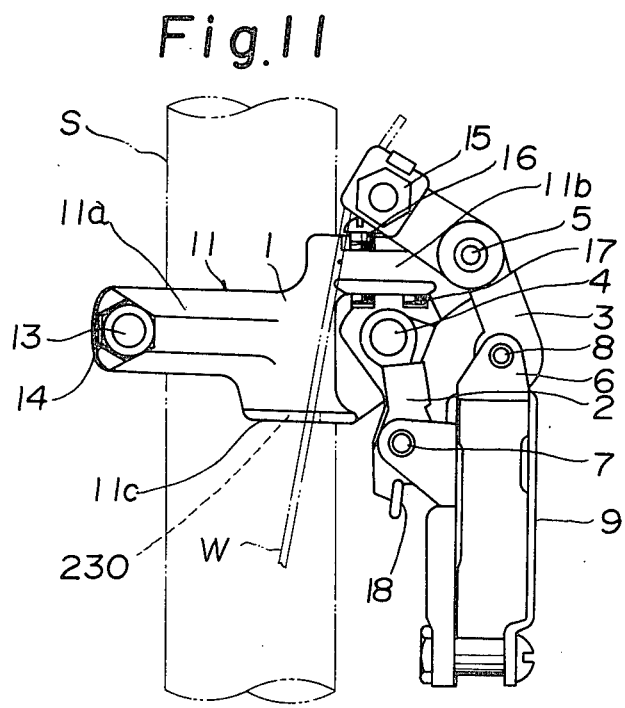

FRONT DERAILLEUR FOR A BICYCLE

This invention relates to a front derailleur for a bicycle, and more particularly to improvements in a front derailleur of the link type comprising a base member, a pair of linkage members pivoted thereto, and a movable member having a chain guide and pivoted to the linkage members.

This kind of front derailleur is generally provided at one of the linkage members with a holder for a control wire and at the base member with a support for an outer sheath guiding the control wire, the support including a socket for receiving one end of the outer sheath. The control wire is inserted through a bore provided at the bottom of the socket, and is fixed by the holder, and the outer sheath is fit into the socket.

Some front derailleurs are controlled by a control wire which does not have the outer sheath, i.e., the so-called bare-wire type. The bare-type control wire is guided by a wire guide mounted to the lower portion of seat tube, or the bottom bracket, and inserted into the bore at the support and then fixed by the holder. With this arrangement, the wire, when controlled for changing the bicycle speed, deflects between the wire guide and the holder to contact with the support, which hinders wire control. Hence, the support, which applies resistance against the wire movement, does not permit proper wire control. Also, the bare-type wire, when operated for changing speed, deflects to contact with the seat tube or the like due to the location of the wire guide, resulting in injury to the surface of the seat tube.

Whether the outer sheath is used or not, the control wire is inserted into the insertion bore at the support and then fixed to the holder. The insertion is carried out after the front derailleur is mounted to the bicycle frame.

However, at one side of the support are located the free end of one of the linkage members, movable member supported thereto, and chain guide, and at the other side of support is occasionally located a mudguard attached to the frame. Hence, the space around the support is restricted thereby complicating insertion and fixing of the control wire.

The present invention has been designed to overcome these problems. A main object of the invention is to provide a front derailleur which can work with either control wires having an outer sheath or those of the bare-wire type, and which requires no elimination of the support for the outer sheath when the bare control wire is used and which performs guidance of the bare wire without hindrance to thereby eliminate the problem of injuring the surface of a seat tube. Another object is to provide a front derailleur permitting ready insertion of a control wire into the insertion bore at the support even when the support is close to of the linkage member, movable member and chain guide, or a mudguard attached to the bicycle frame.

The front derailleur of the invention includes at its base member a mounting nose extending therefrom, and a support having a socket for the outer sheath and an insertion bore for the control wire, the support being mounted to the mounting nose in relation of being integral therewith or independent thereof. At the support and mounting nose are formed guide slots in continuation of the insertion bore, the slots extending radially thereof and in a direction away from the linkage members of the derailleur and each having a length larger than the maximum wire deflection created when a control wire having no outer sheath is operated. Hence, a control wire having an outer sheath and one of the bare-wire type can both be used with the front derailleur of the invention. Moreover, when the bare-type wire is used, the guide slots guide the wire and restrict it to prevent it from approaching the seat tube to thereby prevent the seat tube from being damaged by the wire deflection. Furthermore, the control wire is readily insertable into the insertion bore at the support through the guide slots.

Figure 2:
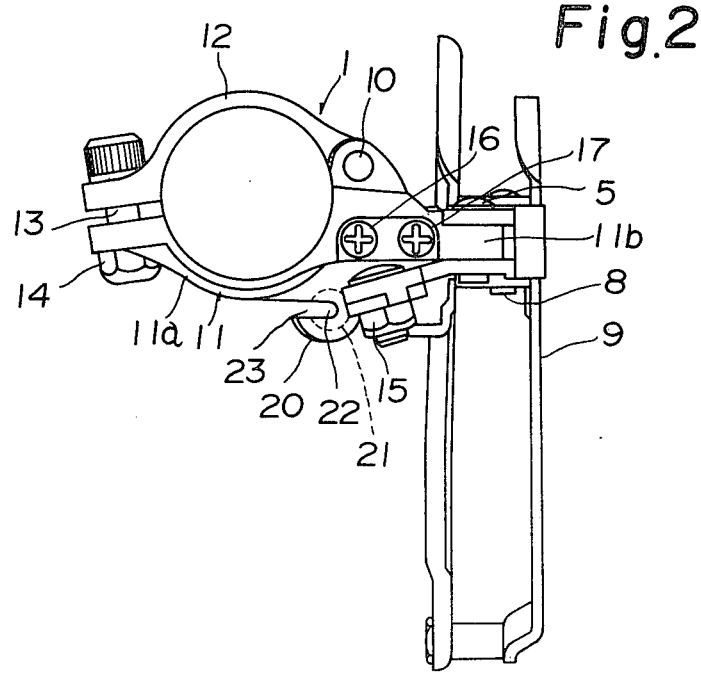
Figure 3:
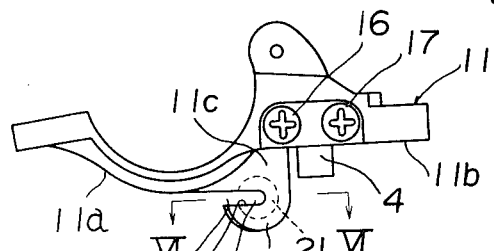
Figure 4:
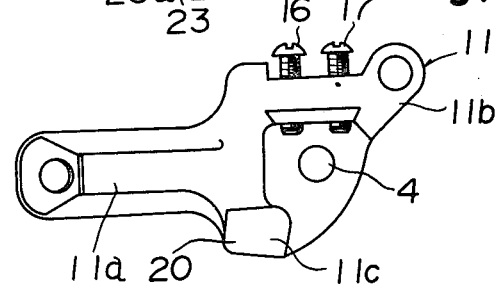
Figure 5:
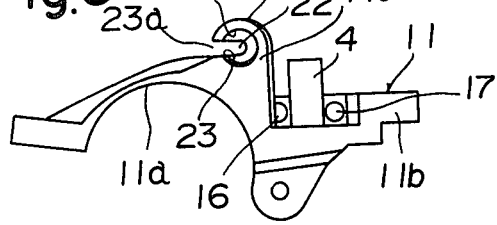
Figure 6:
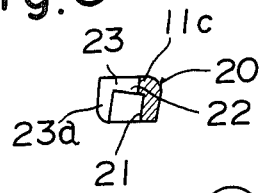
Figure 7:
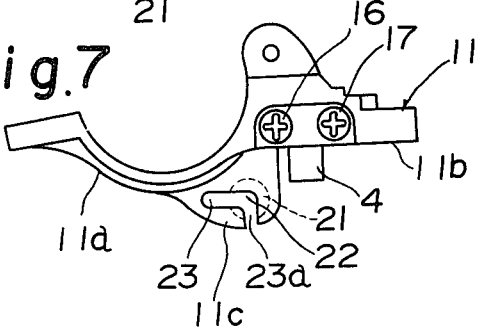

These and other objects and novel features of the invention will be more apparent from description of several embodiments thereof in accordance with the accompanying drawings, in which FIG. 1 is a front view of a front derailleur of the invention, FIG. 2 is a plan view thereof, FIGS. 3 through 5 showing a first segment of a base member, FIG. 3 is a plan view of the first segment, FIG. 4 is a front view thereof, FIG. 5 is a rear view of the same, FIG. 6 is a sectional view taken on Line VI—VI in FIG. 3, FIG. 7 is a plan view of the first segment corresponding to FIG. 3, in which a modified guide slot is shown, FIGS. 8 through 11 showing a modified embodiment of the invention, FIGS. 8 and 9 are a plan and front views of the first segment corresponding to FIGS. 3 and 4, FIG. 10 is a perspective enlarged view of a support only, and FIG. 11 is a front view of the front derailleur from which the support is removed.

Referring to the drawings, reference numeral 1 designates a base member, 2 and 3 designate a pair of linkage members pivoted to the base member 1 through pins 4 and 5, 6 designates a movable member pivotally connected to the free ends of linkage members 2 and 3 through pins 7 and 8 respectively, and 9 designates a chain guide fixed to the movable member 6.

The base member 1 is fixed to a seat tube S at the bicycle, and comprises, a first segment 11 including a semicircular fitting 11a and a support 11b carrying the pins 4 and 5, and a second segment 12 which is semicircular and pivoted to the fitting 11a through a pin 10. The first and second segments 11 and 12 surround the seat tube S and are tightened thereto by a bolt 13 and nut 14. The first segment 11 is extended below the fitting 11a to form a mounting nose 11c, which carries a support 20 for an outer sheath O guiding a control wire W. The support 20 shown in FIGS. 1 through 7 is integrated with the mounting nose 11c as shown in FIGS. 3 and 5 and has a socket 21 for receiving the outer sheath O as shown in FIG. 6. Insertion bores 22 are provided at the bottom of socket 21 and at the mounting nose 11c. At the support 20 and nose 11c are provided guide slots 23 in continuation of the bore 22 and extending radially thereof and in a direction away from the linkage member 2 positioned sidewise of the base member 1. The guide slots 23 are made larger in each length than the maximum wire deflection created when a wire W having no outer sheath is operated.

Also, it is preferable that the guide slots 23, as shown in FIGS. 2, 3 and 5, are opened at a side of the fitting 11a of base member 1 away from the linkage member 2, through openings 23a positioned externally to the mounting nose 11c and support 20 and connected with the guide slots 23 in the extending direction thereof respectively.

In addition, reference numeral 15 designates a holder provided at the linkage member 3 to hold the control wire W, 16 and 17 designate adjusting bolts provided at the support 11b at the first segment 11 for controlling a range of swinging motion of each of the linkage members 2 and 3, and 18 designates a return spring.

Although the movable member 6 is shown as extending integrally from the chain guide 9 it may be formed separately therefrom.

In the above described construction, the control wire W is inserted into the insertion bore 22 at the support 20 in such a manner that the wire W, at a portion near its terminal held by the holder 15, is slidably moved within and along the guide slots 23 from the fitting 11a side to the bore 22, thereby being inserted thereinto.

Hence, there is no need for the wire W to be inserted by way of its terminal into the bore 22, thereby providing for an efficient wire insertion.

Furthermore, the above construction is applicable to the control wire of the so-called bare-wire type having no outer sheath O.

In this instance, the bare wire W is inserted through the guide slot 23, so that when changing the bicycle speed, the slot 23 guides the wire W which moves following the swinging motions of linkage members 2 and 3, so as to prevent the wire from approaching the seat tube S, thus preventing the wire W from contacting with the seat tube and injuring it.

The guide slot 23, which preferably opens at the outside of mounting nose 11c and socket 21 in the extending direction of the guide slot 23 as described above, may further open through an opening 23a perpendicular to the guide slot 23 as shown in FIG. 7. The opening 23a may be positioned in continuation of one end or at an intermediate portion of the guide slot 23.

The support 20, other than being integrated with the mounting nose 11c, may be separate therefrom and detachably mounted thereto as shown in FIGS. 8 and 9.

In this instance, the mounting nose 11c is provided with a guide slot 230 extending in the same direction and having the same length as the guide slot 23.

The guide slot 230 may be formed at an intermediate portion of the mounting nose 11c, but is preferably opened at the side edge of nose 11c through an opening 230a connected with the guide slot 230 and extending therefrom as shown in FIG. 8, in which the slot 230 has length enough to insertably support the support 20.

The guide slot 230, other than being opened at its one end as described, may be opened at an intermediate portion thereof, whereby the wire W is insertable, at an intermediate portion thereof, into the guide slot 230 through its opening.

The support 20 shown in FIG. 10, comprises a socket 21 for the outer sheath O and a leg 24 extending from the bottom of socket 21 which is insertable into the guide slot 230, the bottom of socket 21 and leg 24 are provided with insertion bores 22 for the wire W and with openings 25 through which the bores 22 open radially outwardly. The openings 25 need not be provided, but the wire W can be inserted at an intermediate portion thereof into the bore 22 from the lateral side of support 20. The leg 24 is provided at its utmost end with a flange 24a extending outwardly perpendicularly thereto and an interval between the flange 24a and the bottom of socket 21 is made slightly larger than thickness of the mounting nose 11c, so that the leg 24 is inserted into the guide slot 230 to hold the support 20 and prevent its escape from the mounting nose 11c.

In this construction, when the control wire W has the outer sheath O, the support 20 is inserted into the guide slot 230 at the mounting nose 11c and holds the outer sheath O, and the control wire W is inserted into the insertion bore 22 from the guide slot 230 through the opening 25 and then is fixed at the terminal to the holder 15. The wire W of the bare-wire type is inserted into the guide slot 230 at the mounting nose 11c from which the support 20 is removed, and then fixed at the terminal by the holder 15 as shown in FIG. 11.

The control wire of the bare-wire type, which is inserted into the guide slot 230, is retained therein at an intermediate portion of wire W and also the guide slot 230 is elongate to allow the wire W to move freely along the slot, whereby even when the wire W deflects to control the derailleur, the elongate slot 230 does not interfere with wire W, resulting in its smooth movement.

As clearly understood from the foregoing description, a control wire having an outer sheath and a control wire of the bare-wire type can both be used with the front derailleur of the invention. When the bare-wire type is used, even when the wire deflects to contact with the guide slot during the speed change, no resistance is applied to the wire which would inhibit its smooth movement. Also, the guide slot restricts the wire from approaching the seat tube, whereby the seat tube surface is kept free from injury.

Furthermore, the guide slots are opened at the outsides of the mounting nose and socket, so that the control wire may readily be inserted into the insertion bore through the guide slots. The guide slots are also opened at the position removed from a linkage member so that the wire may easily be inserted into the bore through the guide slot even when the space around the support is restricted due to the position of the linkage member, movable member, chain guide, or attached mudguard.

While preferred embodiments of the invention have been described using specific terms, such description is for illustrative purpose only, and it is to be understood that changes and variations may be made without departing from the spirit or scope of the invention which is defined in the following claims.

What is claimed is:

1. A front derailleur comprising:
   a base member;
   a pair of linkage members pivotally supported to said base member;
   a movable member pivotally supported to said linkage members and having a chain guide;
   a holder for a control wire provided at one of said linkage members; and,
   a support for an outer sheath guiding said control wire provided at said base member, said support being mounted to a mounting nose extending from said base member and having a socket for receiving therein one end of said outer sheath, said mounting nose having an insertion bore for said control wire, said socket having at the bottom thereof an insertion bore for said control wire, and a guide slot directly connected to and in continuation of said insertion bores and extending radially thereof, said guide slot having a width substantially equal to the diameter of said insertion bores extending away from said linkage members and in the same direction of swinging movement of the linkage members and being larger in length than the maximum wire deflection created when a control wire having no outer sheath is used to operate said derailleur.

2. A front derailleur according to claim 1, wherein said guide slot opens outwardly at the outer surface of said mounting nose and at the outer surface of said socket at said support.

3. A front derailleur according to claim 2, wherein the opening of said guide slot is located away from said linkage members.

4. A front derailleur according to claim 2, wherein the opening of said guide slot is disposed in continuation of said guide slot and in the extending direction of said guide slot with respect to said insertion bores.

5. A front derailleur according to claim 1, wherein said support is integrated with said mounting nose extending from said base member.

6. A front derailleur according to claim 1, wherein said support is formed independently of said mounting nose extending from said base member, said support being detachably supported to said mounting nose.

7. A front derailleur according to claim 6, wherein said guide slot opens to the exterior of said mounting nose and said support comprises a socket for receiving said outer sheath and a leg which extends from the bottom of said socket and which is insertable into said guide slot, the bottom of said socket and said leg being provided with insertion bores for said control wire respectively, said socket and leg insertion bores extending radially to open to the exterior of said support.

* * * * *